US008312260B2

(12) United States Patent  
Christian et al.

(10) Patent No.: US 8,312,260 B2
(45) Date of Patent: Nov. 13, 2012

(54) DYNAMIC ANALYTICAL DIFFERENTIATOR FOR OBFUSCATED FUNCTIONS IN COMPLEX MODELS

(75) Inventors: Stacey Michelle Christian, Cary, NC (US); Donald James Erdman, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 304 days.

(21) Appl. No.: 12/576,650

(22) Filed: Oct. 9, 2009

(65) Prior Publication Data

US 2011/0087876 A1   Apr. 14, 2011

(51) Int. Cl.
  *G06F 21/00* (2006.01)
(52) U.S. Cl. ........................................ 713/150
(58) Field of Classification Search ............ 713/150
  See application file for complete search history.

(56) References Cited

U.S. PATENT DOCUMENTS

| | | | | |
|---|---|---|---|---|
| 5,363,320 A | * | 11/1994 | Boyle et al. | 703/2 |
| 6,684,389 B1 | * | 1/2004 | Tanaka et al. | 717/140 |
| 2004/0181772 A1 | * | 9/2004 | Pensak et al. | 717/100 |
| 2009/0077543 A1 | * | 3/2009 | Siskind et al. | 717/136 |

OTHER PUBLICATIONS

Marquardt, Wolfgang; "Higher-Order Derivatives in Computational Systems Engineering Problem Solving"; 5th International Conference on Automatic Differentiation—AD'08; 61 pp. [Aug. 2008].

* cited by examiner

*Primary Examiner* — Jason Gee
(74) *Attorney, Agent, or Firm* — Jones Day

(57) ABSTRACT

Systems and methods are provided for providing secure transmission of software code, which includes a mathematical function, from a first computer to a second computer so that the mathematical function's content cannot be determined at the second computer. A method includes generating a secure container, where the secure container includes an encrypted representation of the mathematical function and metadata identifying the mathematical function encrypted in the secure container. The method further includes providing the secure container from the first computer to the second computer over a communication transmission medium, where the secure container is accessed at the second computer using the metadata to identify the mathematical function, and where the mathematical function contained within the secure container is decrypted and incorporated into program code in a compiled form so that the mathematical function can be used but the mathematical function's content cannot be determined at the second computer.

13 Claims, 10 Drawing Sheets

```
       800
                                              802
       function even(x);
       e = int(x) + sign(mod(x,int(x)));
       if ( mod(e,2) ne 0 ) then e += sign(x);
       return ( e );
       endsub;
```

```
<L n="Prototype">
        <S n="Name"><! [CDATA[even]]></S>
        <S n="Group"><! [CDATA[]]></S>
         <N n="MaxLag">0</N><N n="Flag0">0</N>
         <N n="Flag1">128</N>
         <S n="ReturnType"><! [CDATA[n]]></S>
        <N n="ReturnSize">8</N>
        <L n="ArgList">
                <L n="Arg">
                        <S n="Name"><! [CDATA[x]]></S>
<S n="Kind"><! [CDATA[v]]></S>
<S n="Type"><! [CDATA[n]]></S>
<S n="Class"><! [CDATA[l]]></S>
<N n="Status">0</N>
<N n="Status2">0</N>
<N n="NInit">0</N>
<N n="MaxLag">0</N>
<N n="Size">8</N>
<N n="Flag1">192</N>
<N n="Flag2">0</N>
<N n="Flag3">0</N>
<N n="Flag4">0</N>
</L>
</L>
</L>
```

```
<L n="Statement">
<S n="Code"><! [CDATA[function even(x);]]></S>
<S n="Kind"><! [CDATA[Declarative]]></S>
<N n="Indent">4</N>
</L>

<L n="Statement">
<S n="Code"><! [CDATA[e = int(x) + sign(mod(x,int(x)));]]></S>
<S n="Kind"><! [CDATA[Executable]]></S>
<N n="Indent">6</N>
</L>

<L n="Statement">
<S n="Code"><! [CDATA[if ( mod(e,2) ne 0 ) then]]></S>
<S n="Kind"><! [CDATA[Executable]]></S>
<N n="Indent">6</N>
</L>
```
} 806

Fig. 8B

DYNAMIC ANALYTICAL DIFFERENTIATOR FOR OBFUSCATED FUNCTIONS IN COMPLEX MODELS

FIELD

The technology described in this patent document relates generally to large scale mathematical modeling and more specifically to mathematical model component differentiation and security.

BACKGROUND

Large scale mathematical modeling often requires derivatives, for example, for the optimization of objective functions, resolution of nonlinear systems, and the analysis of sensitivities between input and outputs. The model may be based on one or more mathematical formulas and employ a simple linear equation, a complex neural network, mapped out by sophisticated software, or other implementation.

Agents may desire to break up these mathematical models into component portions so that they can be reused in multiple models. Furthermore, agents desire to keep these component portions proprietary. Difficulties may arise where derivatives of functions contained within the models are needed at or before compile-time but secrecy of the functions must be maintained.

SUMMARY

In accordance with the teachings provided herein, systems and methods are described for providing secure transmission of software code, which includes a mathematical function, from a first computer to a second computer so that the mathematical function can be used by the second computer but the mathematical function's content cannot be determined at the second computer. A method may include accessing the mathematical function at the first computer and generating a secure container. The secure container may include an encrypted representation of the mathematical function and metadata identifying the mathematical function encrypted in the secure container. The method may further include providing the secure container from the first computer to the second computer over a communication transmission medium, where the secure container is accessed at the second computer using the metadata to identify the mathematical function, and where the mathematical function contained within the secure container is decrypted and incorporated into program code in a compiled form so that the mathematical function can be used but the mathematical function's content cannot be determined at the second computer.

As another example, a computer-implemented system for providing secure transmission of software code, which includes a mathematical function, from a first computer to a second computer so that the mathematical function can be used but the mathematical function's content cannot be determined at the second computer may include a processing system having at least one data processor and a computer-readable memory coupled to the processing system. The processing system may be configured to execute steps that include accessing the mathematical function at the first computer and generating a secure container, where the secure container includes an encrypted representation of the mathematical function and metadata identifying the mathematical function encrypted in the secure container. The processing system may be further configured to execute steps that include providing the secure container from the first computer to the second computer over a communication transmission medium, where the secure container is accessed at the second computer using the metadata to identify the mathematical function, where the mathematical function contained within the secure container is decrypted and incorporated into program code in a compiled form so that the mathematical function can be used but the mathematical function's content cannot be determined at the second computer.

As an additional example, a memory for storing data structures for providing secure transmission of software code, which includes a mathematical function, from a first computer to a second computer so that the mathematical function can be used but the mathematical function's content cannot be determined at the second computer may include one or more data structures stored in the memory. The one or more data structures may include information used by an application on the second computer that includes an encrypted representation of the mathematical function and metadata identifying the encrypted mathematical function, where the one or more data structures is transmitted from the first computer to the second computer, and where the one or more data structures is accessed at the second computer using the metadata identifying the mathematical function, where the mathematical function contained within the one or more data structures is decrypted and incorporated into program code in a compiled form so that the mathematical function can be used but the mathematical function's content cannot be determined at the second computer.

BRIEF DESCRIPTION OF THE DRAWINGS

FIG. 8 depicts example data structures for storage on a memory for providing secure transmission of software code, which includes a mathematical function, from a first computer to a second computer so that the mathematical function can be used but the mathematical function's content cannot be detected at the second computer.

DETAILED DESCRIPTION

Figure 1:
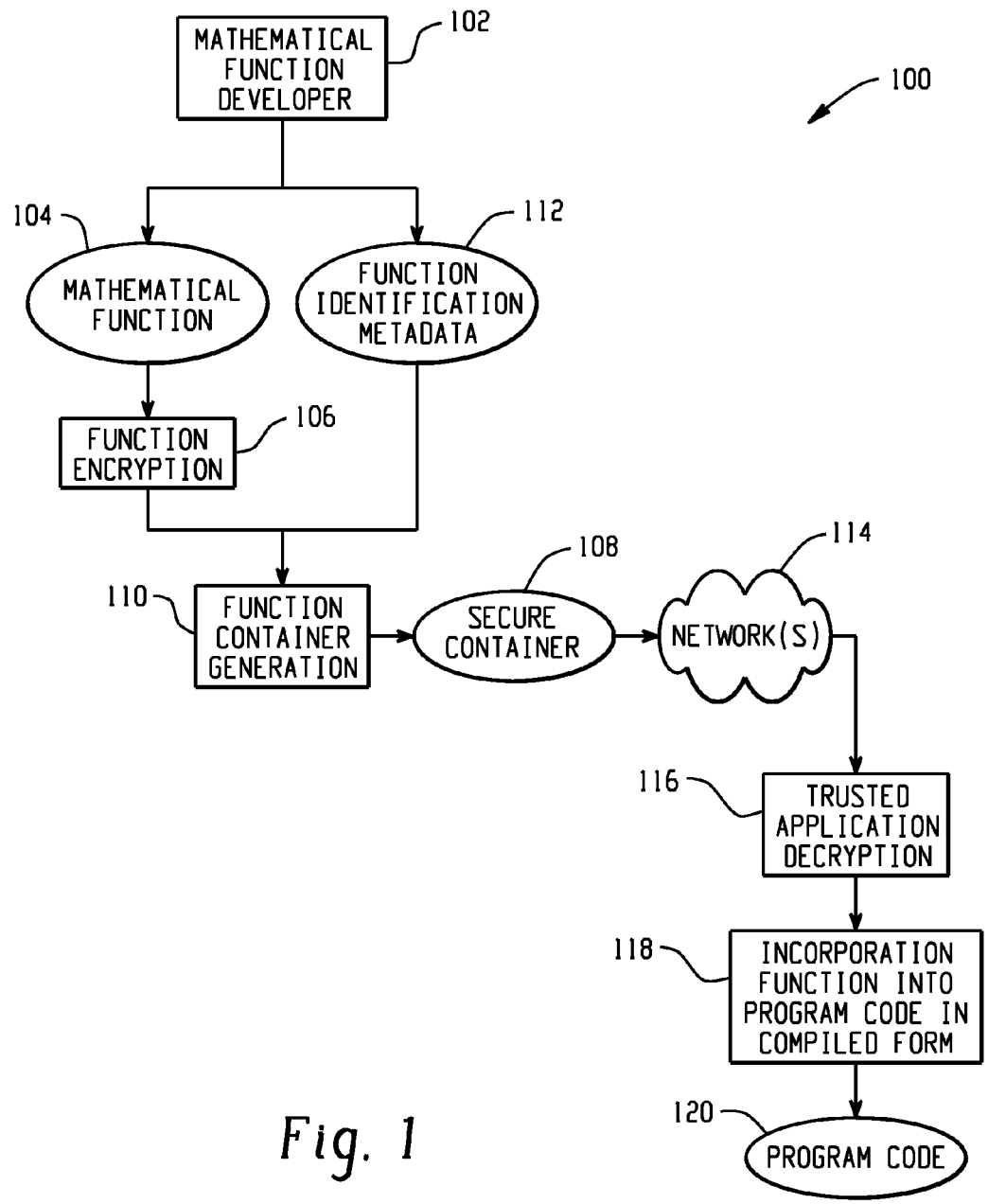
FIG. 1 depicts a computer-implemented environment for providing secure transmission of software code, which includes a mathematical function, from a first computer to a second computer so that the mathematical function can be used by the second computer but the mathematical function's content cannot be determined at the second computer.

FIG. 1 depicts at 100 a computer-implemented environment for providing secure transmission of software code, which includes a mathematical function, from a first computer to a second computer so that the mathematical function can be used by the second computer but the mathematical function's content cannot be determined at the second computer. A mathematical function developer 102 provides a mathematical function 104 that may be considered as proprietary. For example, the mathematical developer 102 may provide a mathematical function 104 used as a component of a complex analytical model. The mathematical function 104 may be encrypted at 106 by any encryption method that will be recognized by one skilled in the art. The encrypted mathematical function 104 may be incorporated into a secure container 108 for transmission at 110. The mathematical function developer 102 may also provide function identification metadata 112. The function identification metadata 112 may include one or more of a name or other identifier of the function, a name or other identifier of inputs and outputs of the function, data types of inputs and outputs of the functions, a description of the function, as well as other data related to the mathematical function. The function identification metadata 112 is incorporated into the secure container 108 in an encrypted or unencrypted form. The secure container may then be transferred over one or more networks 114 to a user computer having an application with a trusted application status with respect to the mathematical function developer 102.

The trusted application receives the secure container and accesses the secure container using the function identification metadata 112 to identify the mathematical function 104 in the secure container. The trusted application decrypts the mathematical function 104 at 116 while disallowing access to the unencrypted mathematical function 104 to any untrusted application or to the user. The trusted application incorporates the unencrypted mathematical function 104 at 118 into program code 120 in a compiled form to obfuscate the mathematical function 104 from any untrusted application or user.

Such an approach as described in FIG. 1 may be used in a variety of contexts. For example, model developers may desire the ability to write standalone, independent mathematical functions for use within larger, more-complex statistical models. Additionally, they may desire the ability for these functions to be differentiated within the context of the larger models in which they are placed. This may be accomplished through a specification and storage format that is robust enough to accommodate dynamic analytical differentiation while providing the ability to obfuscate any proprietary information within the function (e.g. intellectual property in the mathematical functions themselves).

Large scale mathematical programs often require derivatives, such as for the optimization of objective functions, resolution of nonlinear systems, and the analysis of sensitivities between inputs and outputs. For a straight-forward sequence of known equations containing known mathematical operations and functions, this differentiation may be easily solved through mechanical operation of the chain rule.

As computer systems expand to solve larger problems, developers may desire to break up models into independent reusable subtasks or functions. Sometimes, developers may wish to keep these functions proprietary. By keeping the functions secret from users and user applications, such as by providing the functions to users in a precompiled format, the functions appear to the user as a "black box" when used within the model. The precompiled functions have little information about the algorithm within the function that is deducible to the user system. Because of this, the only way differentiation can be performed is through numeric differencing. Numeric differencing may have drawbacks. For example, numeric differencing may be inaccurate due to truncation and round-off error. Further, if a function has a large number of arguments, numeric differencing may become computationally prohibitive (e.g., if a function F has n arguments, $F(X_1, X_2, \ldots, X_n)$, to perform numerical differencing of just the first order derivatives of F with respect to $X_1$ to $X_n$, would require executing the differencing function n+1 times).

Figure 2:
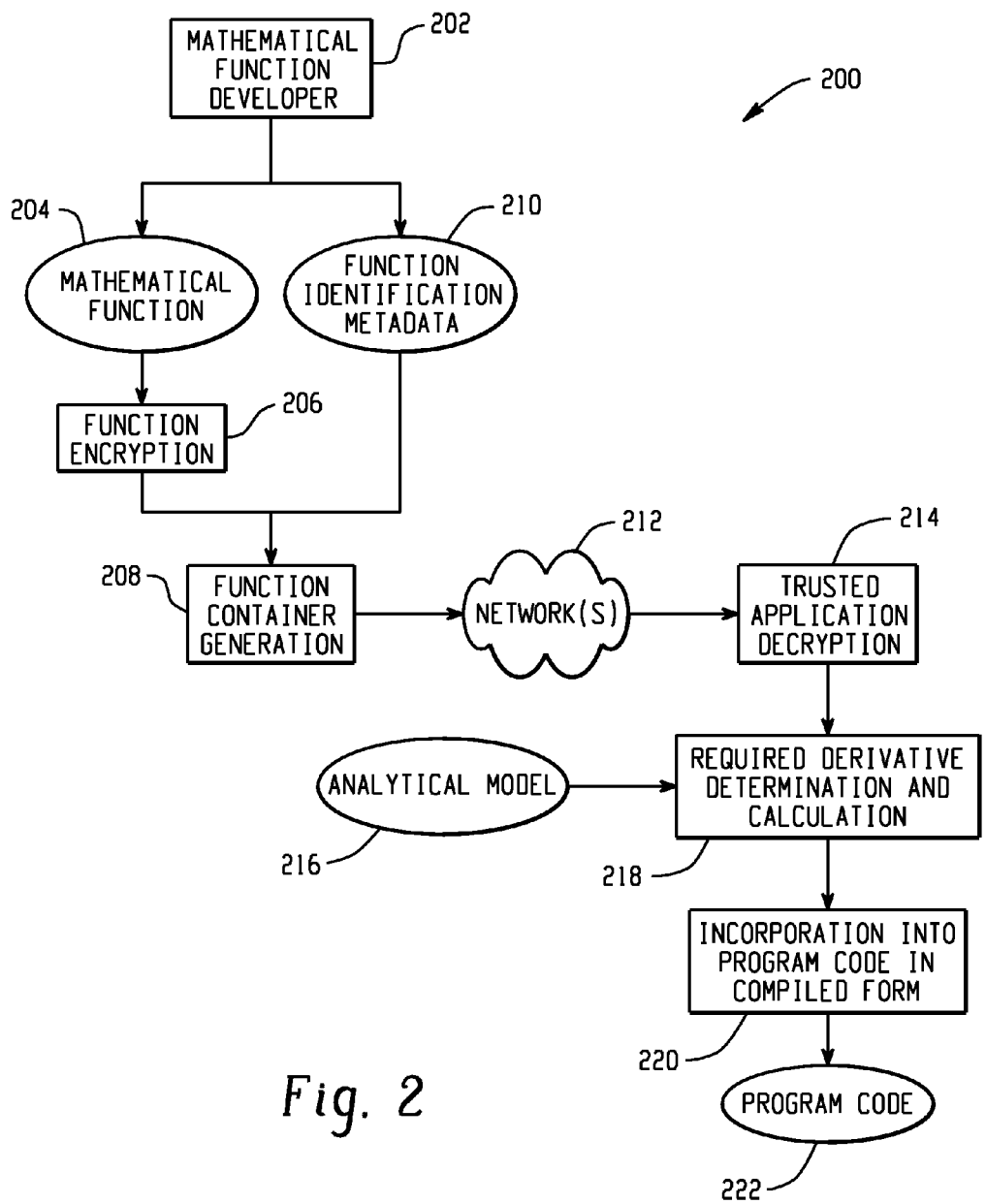
FIG. 2 depicts a computer-implemented environment for providing secure transmission of software code, which includes a mathematical function, from a first computer to a second computer so that the mathematical function can be used by the second computer but the mathematical function's content cannot be determined at the second computer where analytic derivatives of the mathematical function are incorporated into the program code.

FIG. 2 depicts at 200 a computer-implemented environment for providing secure transmission of software code, which includes a mathematical function, from a first computer to a second computer so that the mathematical function can be used by the second computer but the mathematical function's content cannot be determined at the second computer where analytic derivatives of the mathematical function are incorporated into the program code. A mathematical function developer 202 provides a mathematical function 204 that may be considered as proprietary. The mathematical function 204 may be encrypted at 206 by any encryption method that will be recognized by one skilled in the art. The encrypted mathematical function 204 may be incorporated into a secure container for transmission at a function container generator, shown at 208. The mathematical function developer 202 may also provide function identification metadata 210. The function identification metadata 210 may include one or more of a name or other identifier of the function, a name or other identifier of inputs and outputs of the function, data types of inputs and outputs of the functions, a description of the function, as well as other data related to the mathematical function. The function identification metadata 210 is incorporated into the secure container by the function container generator at 208 in an encrypted or unencrypted form. The secure container may then be transferred over one or more networks 212 to a user computer having an application with a trusted application status with respect to the mathematical function developer 202.

The trusted application receives the secure container and accesses the secure container using the function identification metadata 210 to identify the mathematical function 204 in the secure container. The trusted application decrypts the mathematical function 204 at 214 while disallowing access to the unencrypted mathematical function 204 to any untrusted application or to the user. A determination of which derivatives of the mathematical function 204 are to be utilized by an analytical model 216 is performed and the determined derivatives are calculated at 218. At 220, the trusted application incorporates the unencrypted mathematical function 204 and the required derivatives into the program code 222 in a compiled form to obfuscate the mathematical function 204 from any untrusted application or user.

Figure 3:
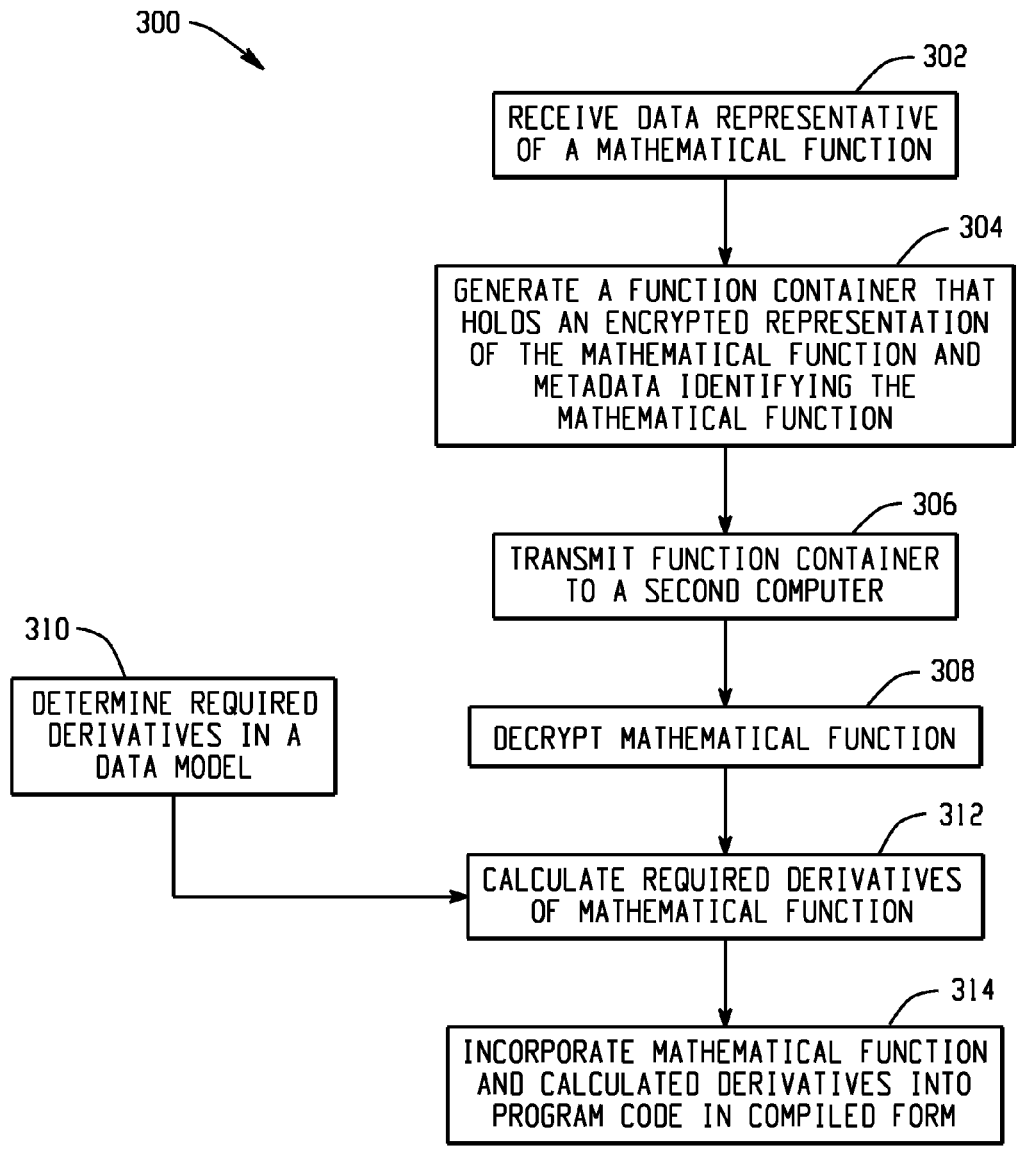
FIG. 3 is a flow diagram depicting a method for providing secure transmission of software code, which includes a mathematical function, from a first computer to a second computer so that the mathematical function and needed derivatives can be used by the second computer but the mathematical function's content cannot be determined at the second computer.

FIG. 3 is a flow diagram depicting at 300 a method for providing secure transmission of software code, which includes a mathematical function, from a first computer to a second computer so that the mathematical function and needed derivatives can be used by the second computer but the mathematical function's content cannot be determined at the second computer. Data representative of a mathematical function is received at 302. This mathematical function data may be received in a high-level language form such as SAS, C, C++, Matlab, Mathematica, or any other computer language. At 304, a function container is generated that holds an encrypted representation of the mathematical function as well as metadata identifying the mathematical function. The function container is transmitted to a second computer at 306 where the mathematical function is decrypted, at 308, by a trusted application. At 310, a determination is made as to derivatives of the mathematical function that are to be used by a model, and the derivatives of the mathematical function are calculated at 312. The mathematical function and the calculated derivatives are incorporated into program code in compiled form at 314.

Figure 4:
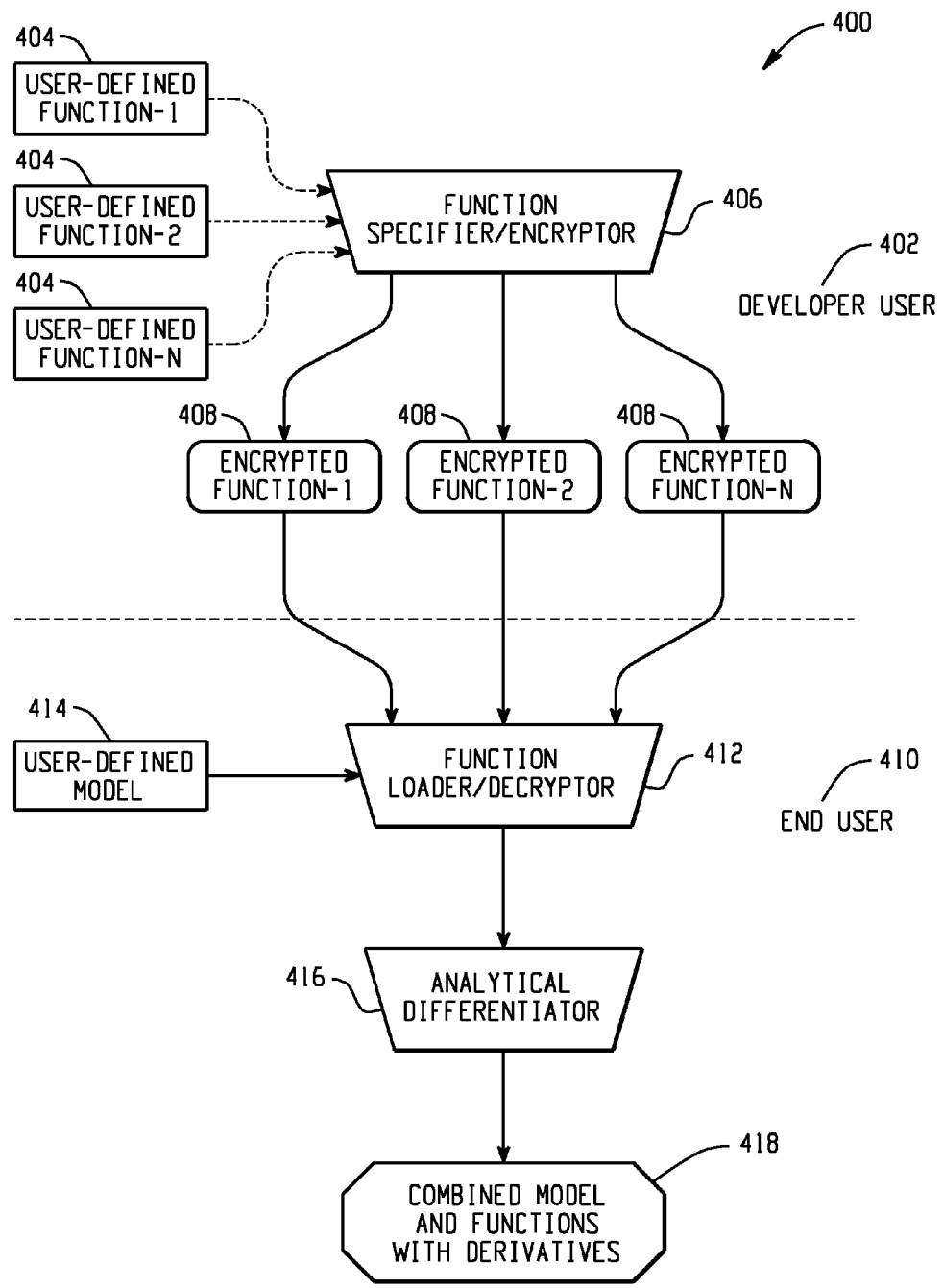
FIG. 4 is a block diagram depicting a system for transmitting obfuscated mathematical functions from a mathematical function developer to an end user.

FIG. 4 is a block diagram depicting at 400 a system for transmitting obfuscated mathematical functions from a mathematical function developer to an end user. Such a system provides a process that allows a developer to specify any number of arbitrary mathematical functions. These functions may be specified in a high-order language that may be the same as the high-order mathematical language in which the models are specified. Mathematical functions may be stored to disk in packages such that all information needed to efficiently load, differentiate, and compile is readily accessible. Stored function packages may be encrypted, enabling the developer agent to share and/or sell functions to others without exposing proprietary algorithms contained within the functions. Password and other protections may also be included with the function packages.

A developer user 402 specifies one or more developer user defined functions 404 and assigns them for encryption using a function specifier/encryptor 406. The function specifier/encryptor 406 outputs a plurality of secure containers 408, each containing an encrypted representation of the developer user defined function 404 as well as metadata for identifying one or more mathematical functions stored in each secure container 408. The secure containers 408 are then transferred to an end user 410 where they are received by a function loader/decryptor 412. The function loader/decryptor 412 may be a trusted application to the developer user 402 such that the function loader/decryptor is enabled to decrypt the secure containers 408 that the function specifier/encryptor 406 encrypted. The function loader/decryptor 412 may also receive input from one or more analytical, predictive, forecasting, simulating, or other models 414. The input from the models 414 is sufficient to enable the function loader/decryptor to determine which derivatives of the developer user defined functions 404 are to be used by the model 414. An analytical differentiator 416 computes the determined derivatives, and the mathematical function and the computed analytical derivatives are incorporated into the model, possibly in compiled form, at 418.

The mathematical functions transferred to the end user 410 may be used and reused to create-large scale models and simulations by the end user 410. The end user 410 may write additional mathematical functions himself or purchase or receive functions from one or more other function developers. When an encrypted function is referenced within a model to be run, the function loader/decryptor 412 provides a programming API and run-time service enabling the analytical differentiator 416 to find a function by name, run data-flow analysis on the requested function, compute analytical derivatives within the context of the required models, compile the models and functions at runtime, and/or obtain compiled function pointers with derivatives.

The function loader 412 may provide a service that loads and analyzes functions once but differentiates and compiles any number of times for any number of models. A data-flow analysis enables the analytic differentiator 416 to determine what derivatives are possible for any function. For example, given a function specified as $F(X_1, X_2, \ldots, X_n)$, a data flow analysis of the function determines which input parameters, $(X_1 \ldots X_n)$ of the function depend on which output parameters of the function. For example, in a function, MyFunc, were specified as:

---
function MyFunc(a,b);
   c = sin(a) + b^2;
   return(c);
   endsub;

--- the data-flow analysis would determine that two first order derivatives of the function are possible: @MyFunc/a and @MyFunc/b. Similarly, four second order derivatives are possible: @MyFunc/a/a, @MyFunc/a/b, @MyFunc/b/a, and @MyFunc/b/b, and so forth.

The function loader 412 may provide procedures to combine any number of stored functions to create large complex models. Dynamic automatic differentiation may be performed on each function within the context of the containing model or simulation. The function loader 412 may determine which derivatives are required with respect to which arguments based on how the functions are used within the larger model. The function may be modified within each model to create a dynamic return structure containing all necessary derivatives.

Figure 5:
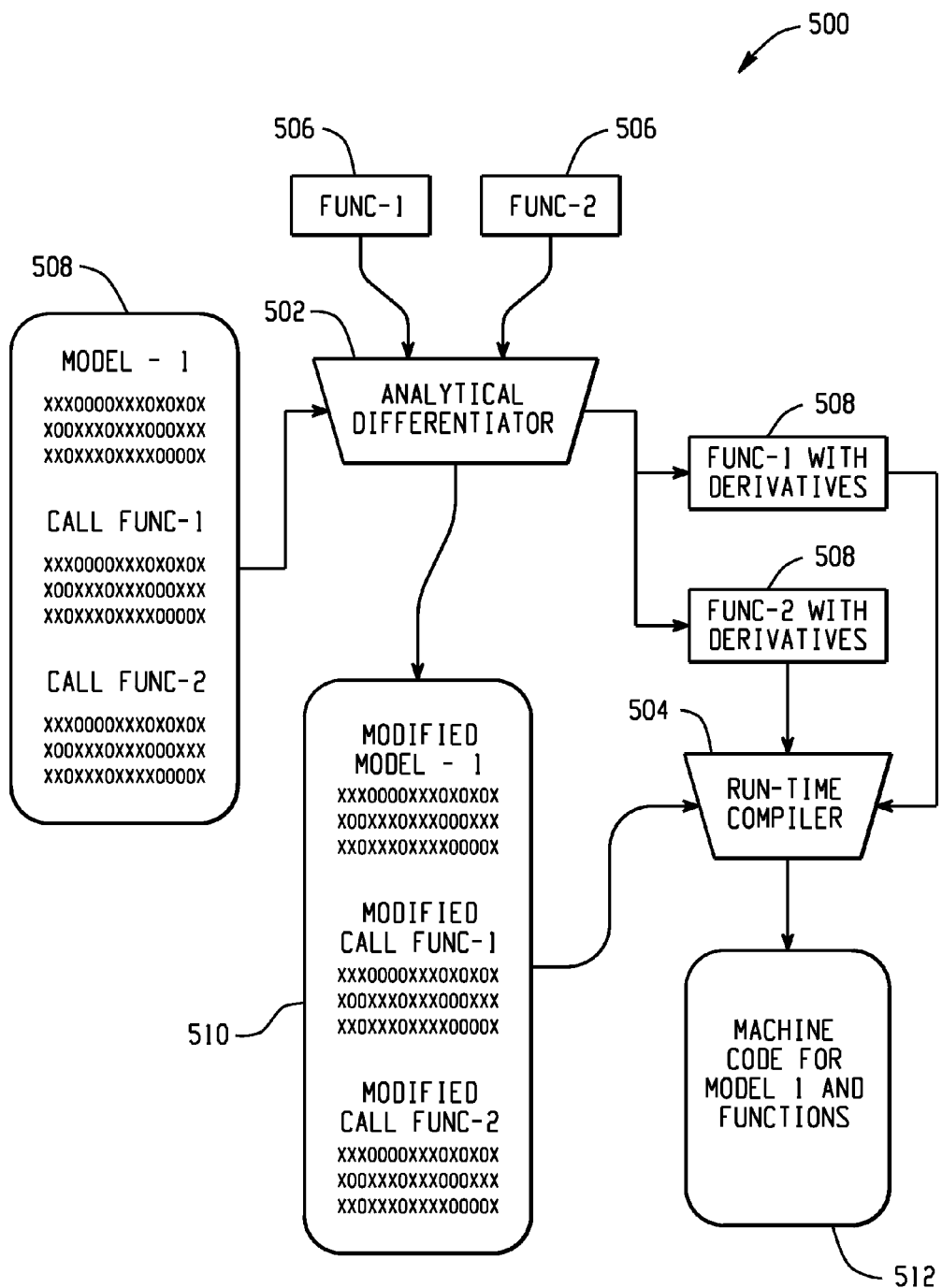
FIG. 5 depicts a block diagram of inputs and outputs to an analytical differentiator and run-time compiler.

FIG. 5 depicts at 500 a block diagram of inputs and outputs to an analytical differentiator 502 and run-time compiler 504. Dynamic automatic differentiation may be performed on each decrypted mathematical function 506 within the context of the containing model or simulation 508. The analytical differentiator 502 receives data from the model 508 and determines derivatives of the mathematical functions 506 to be used by the model 508. The analytical differentiator 502 performs analytic differentiations of the mathematical functions 506 and outputs the mathematical functions and the computed derivatives 508. The analytical differentiator 502 may also perform modifications or optimizations of the model 508, which is outputted as a modified model 510. The runtime compiler 504 receives the functions and their calculated derivatives 508 as well as a form of the model 510. The runtime compiler 504 compiles the inputs into machine code which is outputted at 512.

Figure 6:
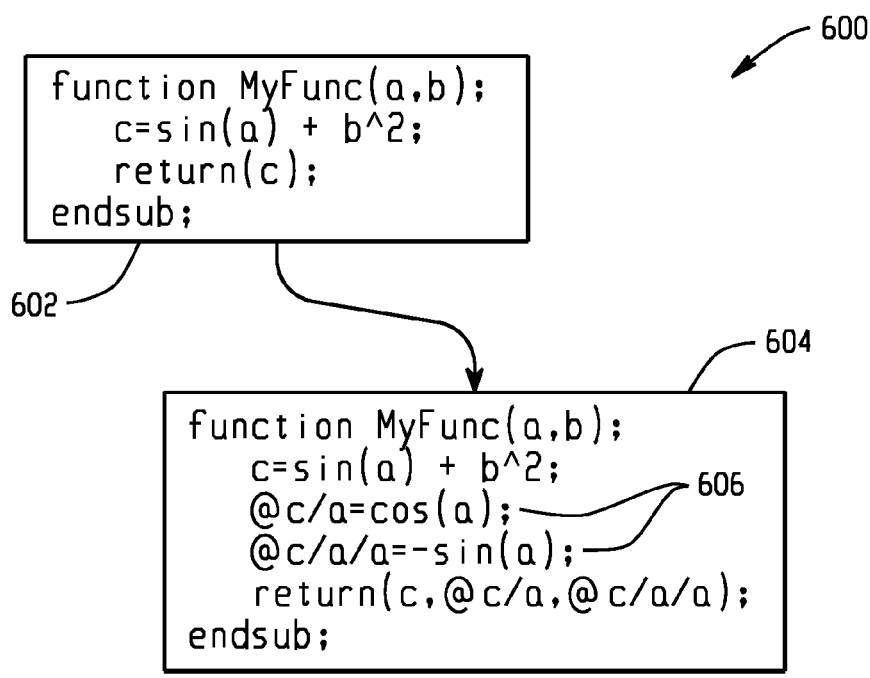
FIG. 6 depicts an example mathematical function having two analytical derivatives inserted by an analytical differentiator.

FIG. 6 depicts at 600 an example mathematical function having two analytical derivatives inserted by an analytical differentiator. A determination is made that two derivatives, @MyFunc/a and @MyFunc/a/a are to be used by a model. The analytical differentiator receives the mathematical function specification 602. The analytical differentiator calculates the determined derivatives to be used by the model and inserts the calculated derivatives into a modified function specification 604, as shown at 606.

Figure 7:
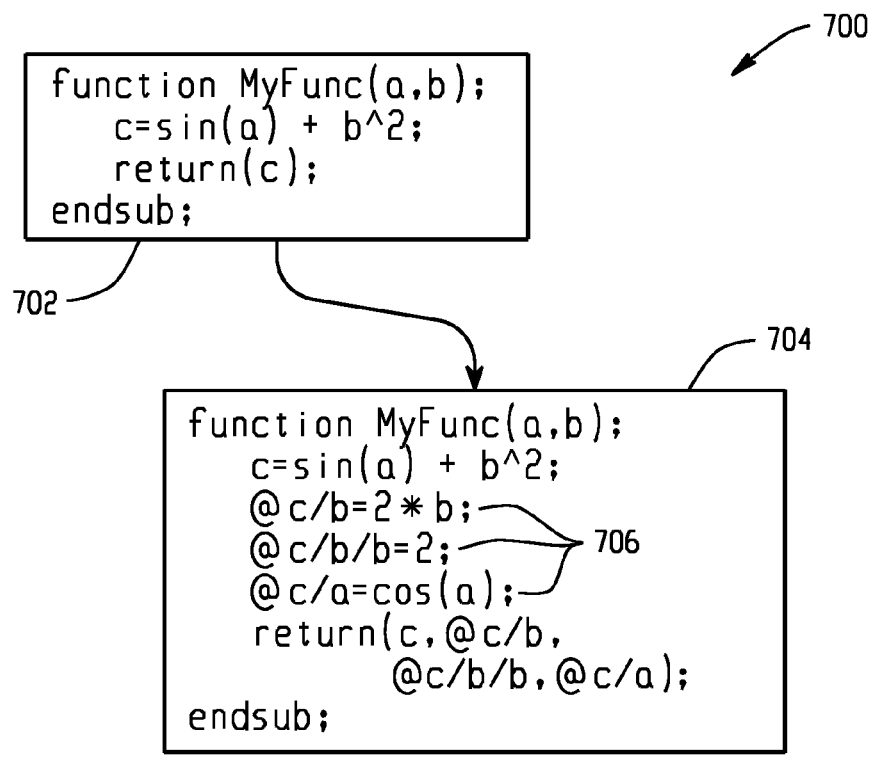
FIG. 7 depicts an example mathematical function having three analytical derivatives inserted by an analytical differentiator.

FIG. 7 depicts at 700 an example mathematical function having three analytical derivatives inserted by an analytical differentiator. A determination is made that three derivatives, @MyFunc/b, @MyFunc/b/b, and @MyFunc/a are to be used by a model. The analytical differentiator receives the mathematical function specification 702. The analytical differentiator calculates the determined derivatives to be used by the model and inserts the calculated derivatives into a modified function specification 704, as shown at 706.

Complex mathematical functions may have thousands of lines of code and the number of possible $n^{th}$ order derivatives could include tens of thousands of lines of code. Thus, only derivatives to be used by the current model may be generated. The model itself may be modified, as described above, to handle the return structure containing the derivatives.

Each mathematical function body may be treated as a complete and independent model. Thus, the differentiator may determine all dependencies between arguments within the function and insert operations into the differentiator's operation tree to perform analytical differentiation. Because each function may be independent and contain its own symbol table, variable dependency matrices may be smaller and faster to derive than they would be if functions were not used. To improve performance, all code for the complete model and its functions may be compiled into machine code at run-time. Pointers to the compiled mathematical functions may also be provided and may be called by an application outside of the model.

FIG. 8 depicts at 800 example data structures for storage on a memory for providing secure transmission of software code, which includes a mathematical function, from a first computer to a second computer so that the mathematical function can be used but the mathematical function's content cannot be detected at the second computer. A specified mathematical function is depicted at 802. A function specifier/encryptor receives the mathematical function 802 and stores metadata describing the mathematical function 802 and an encrypted representation of the mathematical function 802 in a secure container data structure. Example metadata for the mathematical function 802 to be stored in the secure container data structure is depicted at 804. At 806, data portions describing a portion of the mathematical function 802 are encoded into a format such as the depicted XML format. The data portions are then encrypted and included in the secure container data structure.

Figure 9:
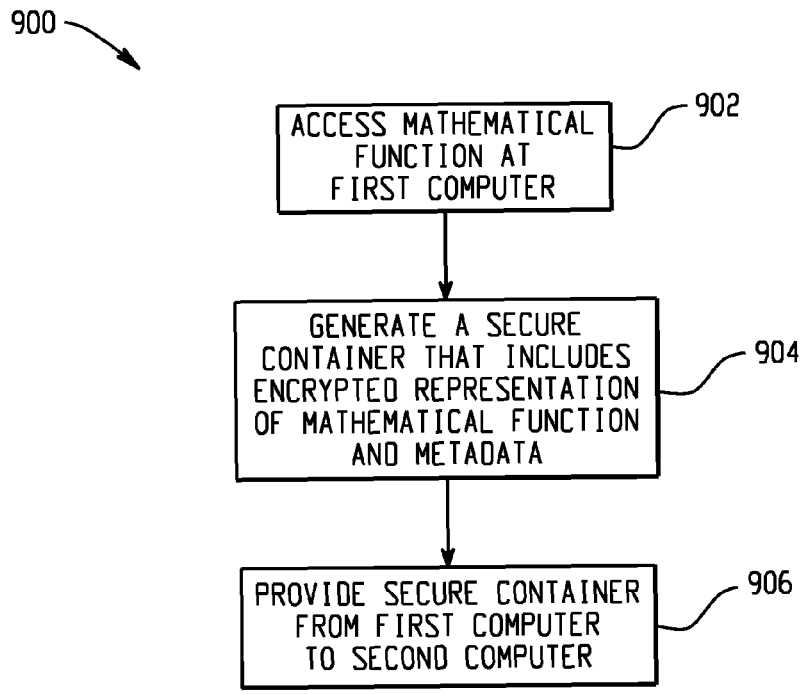
FIG. 9 is a flow diagram depicting a computer-implemented method for providing secure transmission of software code, which includes a mathematical function, from a first computer to a second computer so that the mathematical function can be used by the second computer but the mathematical function's content cannot be determined at the second computer.

FIG. 9 is a flow diagram depicting at 900 a computer-implemented method for providing secure transmission of software code, which includes a mathematical function, from a first computer to a second computer so that the mathematical function can be used by the second computer but the mathematical function's content cannot be determined at the second computer. Current methods do not provide a way to create these functions in a high-order language, such as the language used to define the models themselves. Thus, developers often provide precompiled functions that provide some obfuscation at the cost of the ability for users to perform analytical differentiation of the functions, because the content of the functions can not be discerned by user-end software when the function is received in precompiled form.

The method includes accessing the mathematical function at the first computer at 902. A secure container is generated at 904, where the secure container includes an encrypted representation of the mathematical function and metadata identifying the mathematical function encrypted in the secure container. At 906, the secure container is provided from the first computer to the second computer over a communication transmission medium, where the secure container is accessed at the second computer using the metadata to identify the mathematical function, where the mathematical function contained within the secure container is decrypted and incorporated into program code in a compiled form so that the mathematical function can be used but the mathematical function's content cannot be determined at the second computer.

Figure 10A:
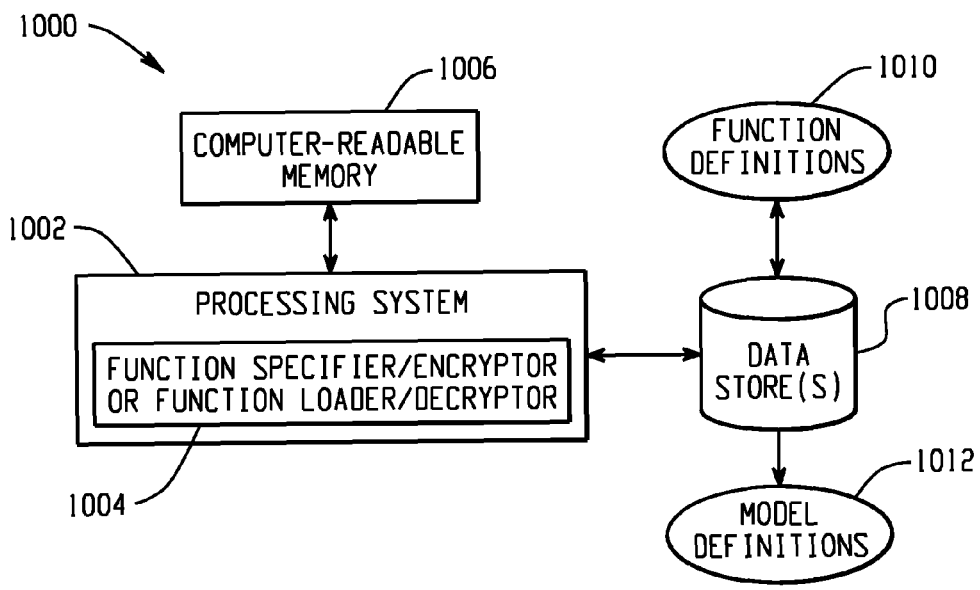
FIGS. 10A, 10B, and 10C depict example processing systems for use in implementing a mathematical function transfer manager.
Figure 10B:
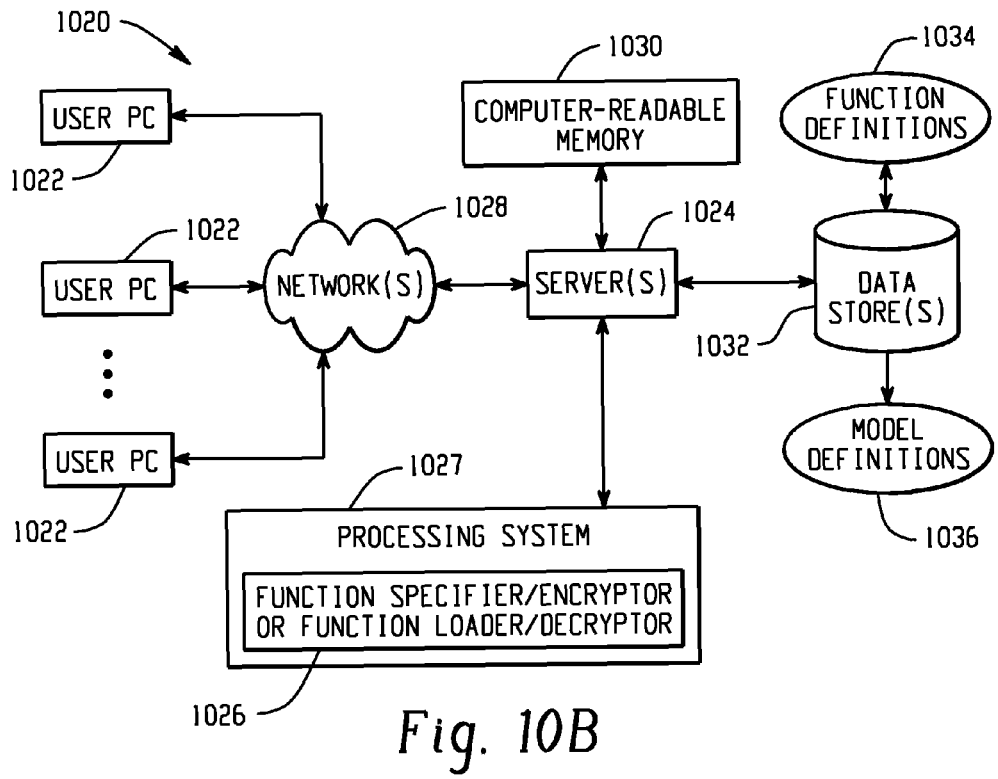
Figure 10C:
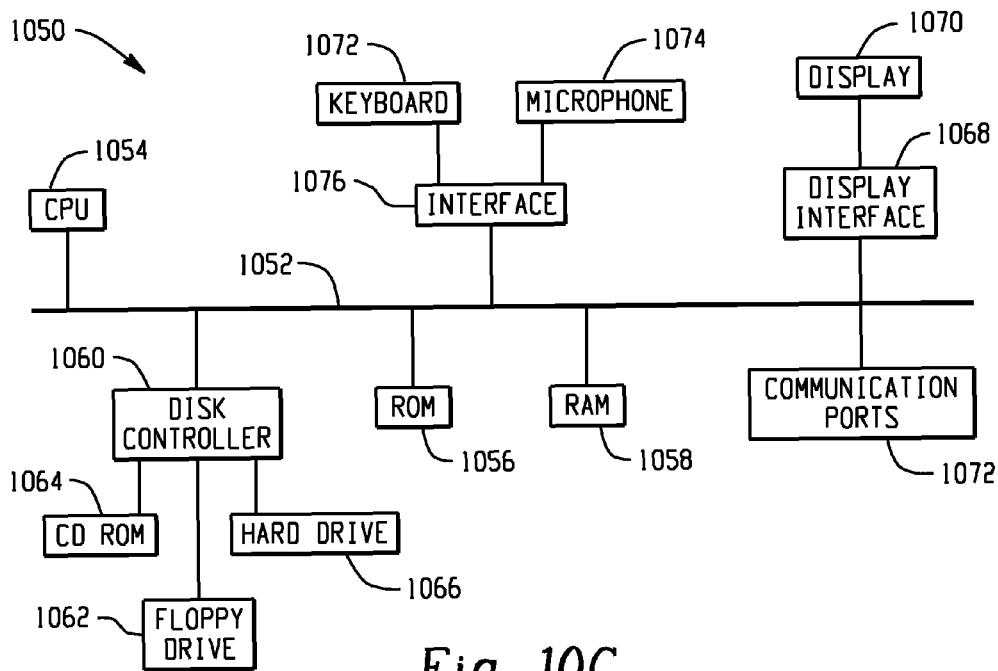

FIGS. 10A, 10B, and 10C depict example systems for use in implementing a mathematical function transfer manager. For example, FIG. 10A depicts an exemplary system 1000 that includes a stand alone computer architecture where a processing system 1002 (e.g., one or more computer processors) includes a function specifier/encryptor or function loader/decryptor 1004 being executed on it. The processing system 1002 has access to a computer-readable memory 1006 in addition to one or more data stores 1008. The one or more data stores 1008 may contain function definitions 1010 and/or model definitions 1012.

FIG. 10B depicts a system 1020 that includes a client server architecture. One or more user PCs 1022 accesses one or more servers 1024 running a function specifier/encryptor or function loader/decryptor 1026 on a processing system 1027 via one or more networks 1028. The one or more servers 1024 may access a computer readable memory 1030 as well as one or more data stores 1032. The one or more data stores 1032 may contain function definitions 1034 and/or model definitions 1036.

FIG. 10C shows a block diagram of exemplary hardware for a system 1050 that may be used to contain and/or implement the program instructions of system embodiments of the present invention. A bus 1052 may serve as the information highway interconnecting the other illustrated components of the hardware. A processing system 1054 labeled CPU (central processing unit) (e.g., one or more computer processors), may perform calculations and logic operations required to execute a program. A processor-readable storage medium, such as read only memory (ROM) 1056 and random access memory (RAM) 1058, may be in communication with the processing system 1054 and may contain one or more programming instructions for performing the method of implementing a mathematical function transfer manager. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1060 interfaces one or more optional disk drives to the system bus 1052. These disk drives may be external or internal floppy disk drives such as 1062, external or internal CD-ROM, CD-R, CD-RW or DVD drives such as 1064, or external or internal hard drives 1066. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1060, the ROM 1056 and/or the RAM 1058. Preferably, the processor 1054 may access each component as required.

A display interface 1068 may permit information from the bus 1056 to be displayed on a display 1070 in audio, graphic, or alphanumeric format. Communication with external devices may optionally occur using various communication ports 1072.

In addition to the standard computer-type components, the hardware may also include data input devices, such as a keyboard 1072, or other input device 1074, such as a microphone, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, interne, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for securely transmitting a mathematical function, comprising:
   accessing, using one or more data processors, a mathematical function;
   generating, using the one or more data processors, an encrypted representation of the mathematical function;
   generating, using the one or more data processors, a secure container, wherein the secure container includes the encrypted representation of the mathematical function and corresponding metadata identifying the encrypted representation of the mathematical function; and
   transmitting, using the one or more data processors, the secure container, wherein when the secure container is received the mathematical function is identified using the corresponding metadata, the mathematical function is decrypted, an analytic derivative of the mathematical function is determined, and a compiled version of the analytic derivative is incorporated into program code, wherein the program code is at least a portion of an unauthorized application, wherein the analytic derivative can be used by the unauthorized application, wherein the analytic derivative cannot be determined via interaction with the unauthorized application, and wherein the compiled version of the analytic derivative obfuscates the mathematical function at a destination computer.

2. The method of claim 1, wherein the analytic derivative is determined at the destination computer.

3. The method of claim 1, wherein the program code includes an analytical model, and wherein the analytic derivative is incorporated into the analytical model in compiled form.

4. The method of claim 1, wherein the analytic derivative is used by the program code to perform an optimization function.

5. The method of claim 1, wherein the mathematical function is a proprietary mathematical function purchased from a developer.

6. The method of claim 1, wherein the analytic derivative is determined using a data-flow analysis.

7. A computer-implemented system for securely transmitting a mathematical function, comprising:
   one or more data processors;
   one or more computer-readable storage mediums containing instructions configured to cause the one or more processors to perform operations including:
   accessing a mathematical function;
   generating an encrypted representation of the mathematical function;
   generating a secure container, wherein the secure container includes the encrypted representation of the mathematical function and corresponding metadata identifying the encrypted representation of the mathematical function; and
   transmitting the secure container, wherein when the secure container is received the mathematical function is identified using the corresponding metadata, the mathematical function is decrypted, an analytic derivative of the mathematical function is determined, and a compiled version of the analytic derivative is incorporated into program code, wherein the program code is at least a portion of an unauthorized application, wherein the analytic derivative can be used by the unauthorized application, wherein the analytic derivative cannot be determined via interaction with the unauthorized application, and wherein the compiled version of the analytic derivative obfuscates the mathematical function at a destination computer.

8. The system of claim 7, wherein the analytic derivative is determined at the destination computer.

9. The system of claim 7, wherein the program code includes an analytical model, and wherein the analytic derivative is incorporated into the analytical model in compiled form.

10. The system of claim 7, wherein the analytic derivative is used by the program code to perform an optimization function.

11. The system of claim 7, wherein the mathematical function is a proprietary mathematical function purchased from a developer.

12. The system of claim 7, wherein the analytic derivative is determined using a data-flow analysis.

13. A computer-program product for securely transmitting a mathematical function, tangibly embodied in a non-transitory machine-readable non-transitory storage medium, including instructions configured to cause a data processing apparatus to:

access a mathematical function;

generate an encrypted representation of the mathematical function;

generate a secure container, wherein the secure container includes the encrypted representation of the mathematical function and corresponding metadata identifying the encrypted representation of the mathematical function; and transmit the secure container, wherein when the secure container is received the mathematical function is identified using the corresponding metadata, the mathematical function is decrypted, an analytic derivative of the mathematical function is determined, and a compiled version of the analytic derivative is incorporated into program code, wherein the program code is at least a portion of an unauthorized application, wherein the analytic derivative can be used by the unauthorized application, wherein the analytic derivative cannot be determined via interaction with the unauthorized application, and wherein the compiled version of the analytic derivative obfuscates the mathematical function at a destination computer.

\* \* \* \* \*